United States Patent [19]

Misenko

[11] 3,839,851

[45] Oct. 8, 1974

[54] GRASS GUIDE FOR ROTARY LAWN MOWERS

[76] Inventor: Samuel S. Misenko, Herman Rd., Manitowoc, Wis. 54220

[22] Filed: Aug. 27, 1973

[21] Appl. No.: 391,831

[52] U.S. Cl. .................................. 56/255, 56/314
[51] Int. Cl. ............................................ A01d 63/04
[58] Field of Search ........ 56/255, 314, 320.1, 320.2

[56] References Cited
UNITED STATES PATENTS

| | | | |
|---|---|---|---|
| 2,659,191 | 11/1953 | Miller et al. | 56/255 X |
| 2,671,299 | 3/1954 | Orr | 56/255 |
| 3,197,951 | 8/1965 | Zick | 56/255 |

Primary Examiner—Antonio F. Guida
Assistant Examiner—J. N. Eskovitz
Attorney, Agent, or Firm—H. Dale Palmatier; James R. Haller

[57] ABSTRACT

A grass guide adapted to be attached to the vertical side wall of a rotary mower blade housing and having a grass-guiding edge which extends centrally beneath the housing and which has forwardly and rearwardly extending, outwardly diverging ends which pass spacedly beneath the lower edge of the housing to terminate in points spaced outwardly therefrom. The grass guide is particularly adapted for deflecting blades of grass growing adjacent the side wall of a building into the path of the rotating blade of a rotary lawn mower, and is operable regardless of whether the mower is being pushed in a forward direction or pulled rearwardly.

7 Claims, 4 Drawing Figures

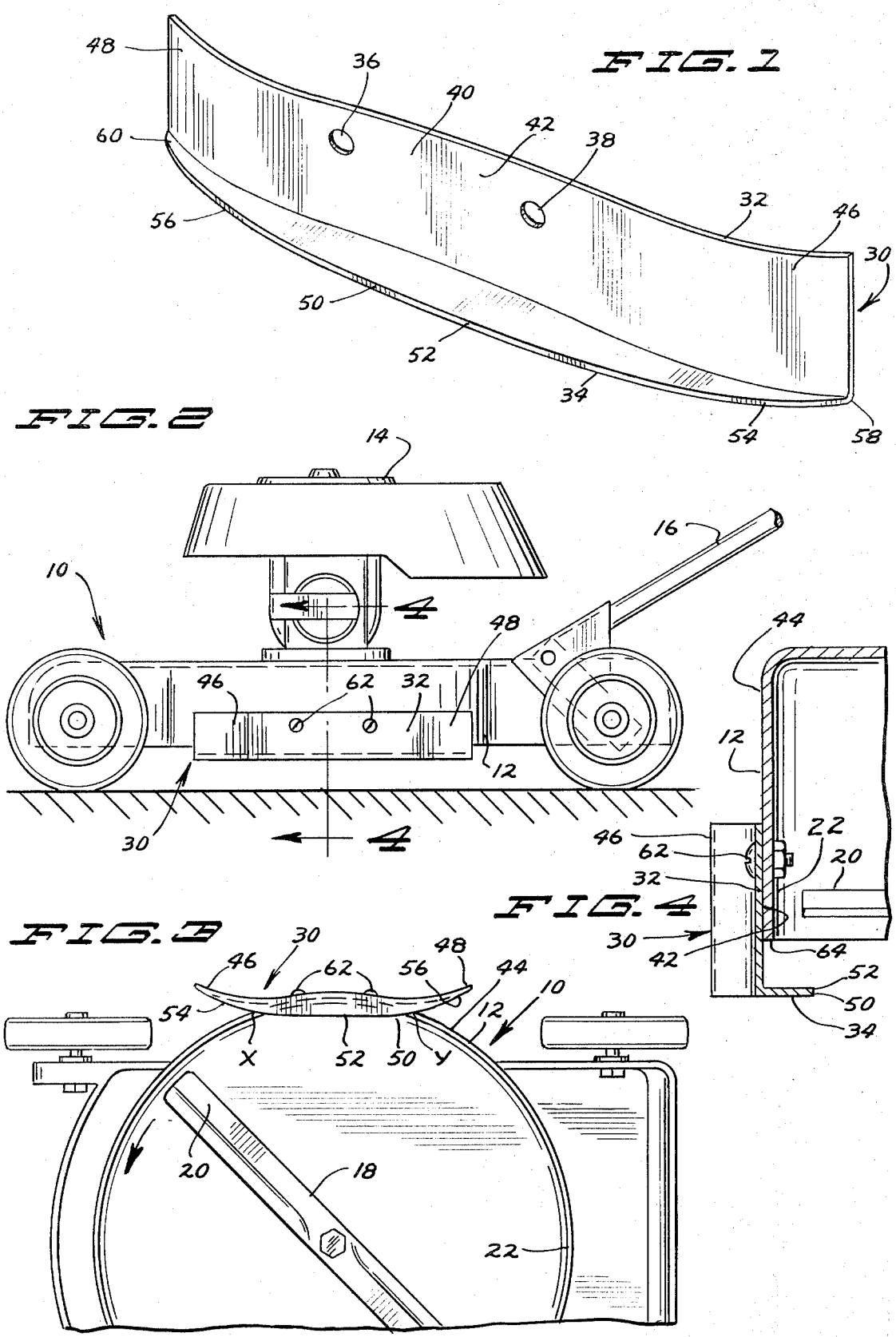

GRASS GUIDE FOR ROTARY LAWN MOWERS

BACKGROUND OF THE INVENTION

The present invention relates to lawn mowers and particularly relates to grass guides attachable to rotary lawn mowers for urging blades of grass growing adjacent a vertical structure into the path of the rotating mower blade.

Rotary lawn mowers adapted for home use ordinarily are provided with a circular blade housing within which the mower blade rotates. The blade must terminate in ends spaced from the inner surface of the mower housing, and hence cannot extend far enough to cut blades of grass growing adjacent a vertical structure such as a house even when the side wall of the mower housing engages the vertical structure. As a result, one ordinarily follows the lawn mowing operation by clipping the blades of grass growing adjacent vertical structures with hand-operated clippers or the like. This is a time-consuming and often strenuous chore which would gladly be dispensed with were it not for the fact that long grass growing adjacent a vertical structure is often exceptionally visible and hence objectionable.

SUMMARY OF THE INVENTION

Briefly, the present invention relates to a grass guide which may be readily attached to rotary lawn mowers and which is adapted to deflect grass growing adjacent a vertical structure inwardly of the mower housing where it may be cut by the rotating blade. The grass guide comprises a vertical bracket adapted to be attached to the vertical side wall of a rotary mower blade housing and a grass deflector carried by the bracket adjacent the lower end of the latter. The grass deflector has a continuous, substantially horizontal grass-guiding edge which has a midportion spaced inwardly of the bracket so as to be positioned internally of the blade housing and spaced below the lower edge of the housing when the bracket is attached to the housing. The grass-guiding edge has forwardly and rearwardly extending, outwardly diverging ends which terminate at points spaced laterally outwardly from the attachment of the bracket to the housing. The grass-guiding edge thus passes vertically beneath the blade housing side wall at points spaced forwardly and rearwardly of the attachment of the bracket to the housing.

BRIEF DESCRIPTION OF THE DRAWING

FIG. 1 is a perspective view of the grass guide of the invention;

FIG. 2 is a side elevation of a rotary lawn mower having the grass guide of the invention attached thereto;

FIG. 3 is a bottom view of the lawn mower of FIG. 2 with the grass guide attached; and FIG. 4 is a broken away, cross-sectional view taken along line 4—4 of FIG. 2.

DETAILED DESCRIPTION OF THE PREFERRED EMBODIMENT

Referring to FIGS. 2 and 3, a rotary lawn mower 10 is provided with a substantially circular blade housing 12 having a motor 14 mounted thereon and a rearwardly extending handle 16. A rotary blade 18 rotates within the housing and extends radially outwardly to terminate at ends 20 which are spaced from the inner surface 22 of the vertical blade housing 12.

Attachable to the outer surface of the vertical side wall of the blade housing 12 is the blade guide 30 of the invention. The grass guide may be formed from a rod having a substantially L-shaped cross section (as shown in FIG. 4), and includes a vertical plate (hereinafter "bracket") 32 from the lower edge of which laterally extends a horizontal plate 34. The bracket 32 has a central section 40 with orifices 36 and 38 therethrough for mounting the bracket to the side wall of a mower blade housing by bolts or the like. The central section 40 of the bracket has a slight concave curve therein, at least adjacent its upper edge, so that the inner surface 42 thereof is contoured to fit closely against curved ends 46 and 48 of the the arcuate outer surface 44 of the side wall of the mower blade housing. The arcuate ends 46 and 48 of the bracket 32 extend forwardly and rearwardly, respectively, of the central section 40 and are reversely curved with respect to the central section 40 so as to diverge laterally outwardly thereof.

The horizontal plate 34 terminates laterally inwardly in a grass-guiding edge 50 which has a midportion 52. When the bracket 32 is attached to the side wall of the blade housing 12, the midportion 52 of the grass-guiding edge 50 is positioned inwardly of the blade housing and is spaced therebeneath, as shown in FIG. 4. Preferably, the midportion 52 of the grass-guiding edge extends inwardly of the housing a sufficient distance so as to lie below the outer end 20 of the rotary blade. The ends 54 and 56 of the grass-guiding edge 50 extend forwardly and rearwardly of the central portion 52, and are arcuately curved so as to diverge outwardly from the midportion 52 aNd terminate at points 58 and 60 coextensive with the forward and rearward ends of the bracket 32 and spaced laterally outwardly from the points of contact of the inner surface 42 of the bracket with the outer surface 44 of the blade housing.

The grass guide of the invention may be made from an elongated plate of aluminum which is suitably bent as described above. The walls of the bracket and horizontal plate may be ⅛" thick, the bracket may be 1¾" high and 10¾" in length, and the midportion 52 of the grass-guiding edge may extend laterally inwardly from the inner surface 42 of the bracket for a distance of ⅝". The curvature of the arcuately bracket and 54 and 56 of the grass-guiding edge may be sufficiently severe so that a straight line joining the terminal points 58 and 60 is spaced outwardly from the inner surface 42 of the bracket by as much as ⅝" or more.

In use, the grass guide of the invention is attached to the side wall of the vertical blade housing of a rotary mower by means of bolts 62 which pass through apertures 36 and 38, the inner surface 42 of the bracket closely conforming to the outer surface 44 of the blade housing. If desired, the apertures 36 and 38 may be slotted vertically to permit vertical adjustment of the grass guide with respect to the mower housing. When in position, the grass-guiding edge 50, which lies in substantially a horizontal plane throughout its length, is spaced beneath the lower edge 64 of the vertical blade housing by a distance of at least ⅜". As will be noted from the drawing, and particularly FIGS. 1, 2 and 5 thereof, the grass-guiding edge 50 is spaced inwardly from the inner surface 42 of the bracket which contacts and is attached to the outer surface of the mower housing. As a result, the grass-guiding edge 50 passes vertically beneath the lower edge 64 of the mower housing at points X and Y in FIG. 3, which points are spaced forwardly and rearwardly of the contact between the bracket and the side wall of the blade housing. Hence, blades of grass which are encountered by the ends 54 or 56 of the grass-guiding edge will be bent inwardly of the housing at approximately points X or Y, and such blades of grass accordingly cannot become lodged or stuck between the outer surface 44 of the mower housing and the inner surface of the bracket where these surfaces merge (approximately at the location of the apertures 36 and 38). Thus, the vertical skirt of the mower housing need not be slotted or otherwise apertured to permit grass which has been deflected by the guiding edge 50 to enter the mower housing. The grass guide of the invention is preferably symmetrical about a vertical line passing centrally thereof, and hence the same grass-deflecting and non-lodging results are obtained regardless of whether the mower is pushed forwardly or pulled rearwardly. The ends 58 and 60 of the grass-guiding edge are adapted to encounter blades of grass growing adjacent a wall or other vertical structure, and to deflect such grass inwardly of the housing where it may be cut by the rotating mower blade.

Manifestly, I have provided a grass guide which is simple in operation, which may be easily attached to and detached from a rotary mower housing, which is inexpensive to produce and uncomplicated to use, which has no parts which move during use, and which does not require extensive preliminary modifications of the lawn mower.

While I have described a preferred embodiment of my invention, it should be understood that various changes, adaptations, and modifications may be made therein without departing from the spirit of the invention and the scope of the appended claims.

What I claim is:

1. Grass guide for rotary lawn mowers comprising a vertical bracket having a portion attachable to the vertical side wall of a mower blade housing and a grass deflector carried by the bracket adjacent the lower end of the latter, the grass deflector having a continuous, substantially horizontal grass-guiding edge having a midportion spaced inwardly of the bracket so as to be positioned internally of the blade housing and spaced below the lower housing edge when the bracket is attached to the blade housing, the edge having forwardly and rearwardly extending, outwardly diverging ends terminating at points spaced laterally outwardly from the portion of the bracket attachable to the blade housing, whereby, when the grass guide is attached to the housing, the grass-guiding edge thereof passes vertically beneath the blade housing side wall at points spaced forwardly and rearwardly of the attachment of the bracket to the housing.

2. The grass guide of claim 1 wherein the portion of the bracket adapted for attachment to the vertical side wall of a mower blade housing is concave inwardly so as to conform to the outer surface of the housing.

3. The grass guide according to claim 2 wherein the bracket is substantially coextensive in length with the grass-guiding edge and wherein the forwardly and rearwardly extending ends of the grass-guiding edge diverge arcuately outwardly to terminate at the longitudinal ends of the bracket.

4. Unitary grass guide comprising an elongated bar having a substantially L-shaped cross section defining a substantially vertical plate having a substantially horizontal plate extending from its lower edge, the vertical plate defining a bracket having a central section attachable to the arcuate outer surface of the side wall of a rotary blade housing, and the horizontal plate having a continuous, longitudinal grass-guiding edge having a midportion and arcuate ends extending forwardly and rearwardly therefrom, the midportion of the grass-guiding edge being spaced laterally inwardly of the bracket so as to extend inwardly beneath the lower edge of the mower blade housing in downwardly spaced relationship thereto when the bracket is exteriorly attached to the side wall of the blade housing, the arcuate ends of the grass-guiding edge diverging laterally upwardly from its midportion and terminating at ends spaced outwardly from the central section of the bracket, whereby, when the bracket is attached to the housing, the forwardly and the rearwardly extending arcuate ends of the grass-guiding edge pass spacedly beneath the vertical side wall of the mower blade housing at points spaced forwardly and rearwardly, respectively, of the attachment of the bracket to the housing.

5. Unitary grass guide for use with a rotary mower and comprising a rod which is substantially L-shaped in cross section to define a vertical plate having a horizontal plate extending from its lower edge, the vertical plate having a curved central section with an inner contact surface adapted to contact and fit closely against the arcuate vertical outer surface of a rotary mower blade housing for attachment thereto by bolts or the like, the vertical plate having reversely curved, outwardly diverging, forwardly and rearwardly extending arcuate ends, the horizontal plate terminating laterally in a continuous grass-guiding edge having an inwardly directed midportion adapted to extend interiorly of the lower edge of the blade housing and be spaced therebeneath when the bracket is attached to the housing, the grass-guiding edge having arcuate, outwardly diverging, forwardly and rearwardly extending ends terminating longitudinally with the ends of the vertical plate and spaced laterally outwardly from the inner vertical contact surface of the bracket, whereby, when the grass guide is attached to the mower housing, the grass-guiding edge thereof passes vertically beneath the vertical wall of the blade housing at points spaced forwardly and rearwardly of the contact between the vertical plate and the side wall of the blade housing.

6. The grass guide according to claim 5 wherein the vertical spacing between the grass-guiding edge and the bottom edge of the blade housing is at least ⅜".

7. In combination, a rotary lawn mower having a vertical side blade housing surface, and a grass guide comprising a vertical bracket having a portion attached to the vertical side blade housing surface of the lawn mower and a grass deflector carried by the bracket adjacent the lower end of the latter, the grass deflector having a continuous, substantially horizontal grass-guiding edge having a midportion spaced inwardly of the bracket and positioned internally of and spaced below the blade housing, the grass-guiding edge having forwardly and rearwardly extending, outwardly diverging ends terminating at points spaced laterally outwardly from the portion of the bracket attached to the blade housing, the grass-guiding edge passing vertical beneath the blade housing side wall at points spaced forwardly and rearwardly of the attachment of the bracket to the housing.

* * * * *